US012346673B1

(12) United States Patent
Gonugondla et al.

(10) Patent No.: US 12,346,673 B1
(45) Date of Patent: Jul. 1, 2025

(54) LARGE LANGUAGE MODELS UTILIZING ELEMENT-WISE OPERATION-FUSION

(71) Applicant: Amazon Technologies, Inc., Seattle, WA (US)

(72) Inventors: Sujan Kumar Gonugondla, Secaucus, NJ (US); Bohan Yao, Bothell, WA (US); Haifeng Qian, Mount Kisco, NY (US); Xiaokai Wei, Jersey City, NJ (US); Jiacheng Guo, Kirkland, WA (US); Vamshidhar Krishnamurthy Dantu, Sunnyvale, CA (US); Praphruetpong Athiwaratkun, Jersey City, NJ (US); Ramesh M. Nallapati, San Jose, CA (US); Parminder Bhatia, Kearny, NJ (US); Srinivas Iragavarapu, Redmond, WA (US); Yuchen Tian, Santa Clara, CA (US); Rama Krishna Sandeep Pokkunuri, Redmond, WA (US); Sudipta Sengupta, Bellevue, WA (US); Bing Xiang, Mount Kisco, NY (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 18/194,377

(22) Filed: Mar. 31, 2023

(51) Int. Cl.
*G06F 8/35* (2018.01)
*G06F 40/20* (2020.01)

(52) U.S. Cl.
CPC ............... *G06F 8/35* (2013.01); *G06F 40/20* (2020.01)

(58) Field of Classification Search
CPC .................................. G06F 8/35; G06F 40/20
USPC .................................................. 717/101–178
See application file for complete search history.

(56) References Cited

U.S. PATENT DOCUMENTS

| | | | |
|---|---|---|---|
| 10,872,601 B1 * | 12/2020 | Acharya | G06F 40/295 |
| 11,100,193 B2 * | 8/2021 | Gu | G06F 12/0802 |
| 11,132,512 B2 * | 9/2021 | Wu | G06N 3/044 |
| 11,586,908 B1 * | 2/2023 | Gural | G06N 3/0495 |
| 11,748,555 B2 * | 9/2023 | Tran | G06F 40/137 |
| | | | 715/202 |
| 11,886,826 B1 * | 1/2024 | Bavarian | G06F 40/253 |
| 2021/0209304 A1 * | 7/2021 | Yang | G06F 40/295 |
| 2021/0374352 A1 * | 12/2021 | Li | G06N 20/00 |

OTHER PUBLICATIONS

Chen, Mark, et al. "Evaluating large language models trained on code." arXiv preprint arXiv:2107.03374 (2021).pp. 1-35 (Year: 2021).*

Howard, Jeremy, and Sebastian Ruder. "Universal language model fine-tuning for text classification." arXiv preprint arXiv: 1801. 06146 (2018).pp.328-339 (Year: 2018).*

(Continued)

*Primary Examiner* — Satish Rampuria
(74) *Attorney, Agent, or Firm* — Nicholson De Vos Webster & Elliott LLP

(57) ABSTRACT

Techniques for using a quantized and/or fused model are described. In some examples, a service is to receive a request to use a trained model, the request including input data; apply a trained model to the input data, the application of the trained model includes fusing one or more matrix multiplication operations with element-wise operations; and output a result from the trained model.

20 Claims, 14 Drawing Sheets

(56) References Cited

OTHER PUBLICATIONS

Su, Yixuan, et al. "Non-autoregressive text generation with pre-trained language models." arXiv preprint arXiv:2102.08220 (2021). pp.1-10 (Year: 2021).*

Colas, Anthony, Mehrdad Alvandipour, and Daisy Zhe Wang. "GAP: A graph-aware language model framework for knowledge graph-to-text generation." arXiv preprint arXiv:2204.06674 (2022). pp. 1-15. (Year: 2022).*

Ouyang, Long, et al. "Training language models to follow instructions with human feedback." Advances in neural information processing systems 35 (2022): pp. 27730-27744. (Year: 2022).*

Kandpal, Nikhil, Eric Wallace, and Colin Raffel. "Deduplicating training data mitigates privacy risks in language models." International Conference on Machine Learning. PMLR, 2022.pp. 10697-10707 (Year: 2022).*

DeepSpeed-MII: instantspeedup on 24,000+ open-source DL models with up to40x cheaper inference, Oct. 10, 2022.

Reza Yazdani et al., DeepSpeed Inference: Enabling Efficient Inference of Transformer Models at Unprecedented Scale, Jun. 30, 2022.

Xiaokai Wei et al., Greener yet Powerful: Taming Large Code Generation Models with Quantization, Mar. 9, 2023, 1-12.

Zhewei Yao et al., ZeroQuant: Efficient and Affordable Post-Training Quantization for Large-Scale Transformers, Jun. 4, 2022.

* cited by examiner

LARGE LANGUAGE MODELS UTILIZING ELEMENT-WISE OPERATION-FUSION

BACKGROUND

Generative language models have become ubiquitous and their deployment requires large compute resources and costs. Furthermore, the large inference latencies would hinder user experiences and make many applications intractable. The limiting factors in speeding up the models and reducing their deployment costs are the GPU/Accelerator memory limitations and IO bandwidth limitation. This requires are more stringent for generative large-language models as we need to store all parameters of the model in the memory and repeated fetch them for generating each token.

BRIEF DESCRIPTION OF DRAWINGS

Various examples in accordance with the present disclosure will be described with reference to the drawings, in which.

DETAILED DESCRIPTION

Figure 1:
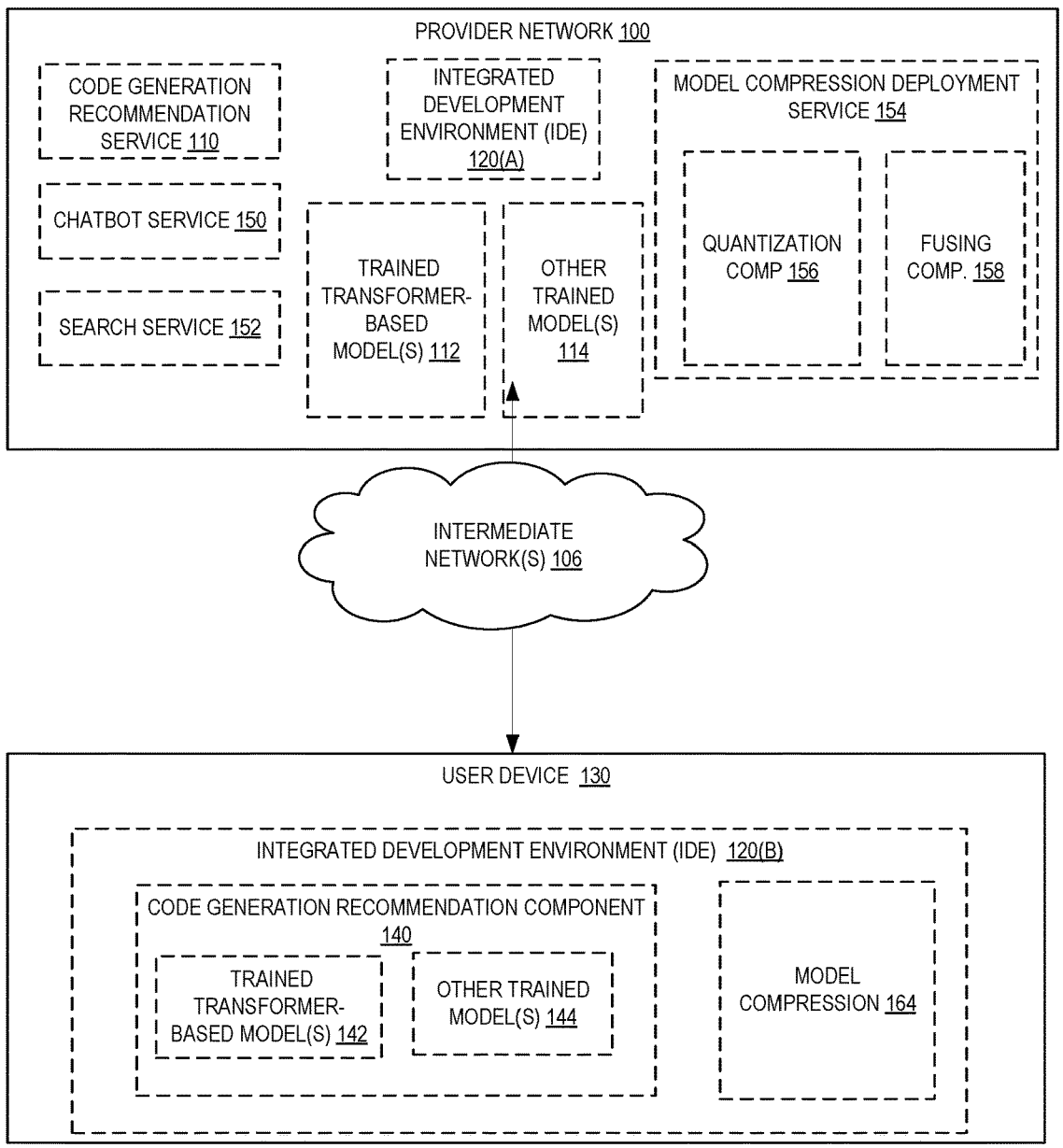
FIG. 1 illustrates examples of one or more services that are provided as a part of a provider network's offerings.

The present disclosure relates to methods, apparatus, systems, and non-transitory computer-readable storage media for performing inference for large language models using quantization and/or element-wise operation fusion.

ML-powered code generation aims to assist developers in the writing of code in a more productive manner by intelligently generating code blocks based on natural language prompts. Some ML-powered code generation use large pretrained deep learning models to perform this task. Despite their great power, the huge number of model parameters of these models poses a significant threat to their adaptation in a regular software development environment, where a developer might use a standard laptop or mid-size server to develop code, as these large models incur significant resource usage (in terms of memory, latency, and cost) as well as having a large carbon footprint.

Recently, applying Transformer-based Pretrained Language Models (PLMs) to the source code generation task has drawn considerable attention. The goal is to generate complete or code fragments given natural language or partial code as prompts. To achieve this goal, large language models are trained on humongous code corpora, typically curated from open-source code archives like GitHub, Stack Overflow, etc.

In some examples, the PLMs typically use a decoder-only (e.g., GPT) or an encoder-decoder architecture (e.g., BART/T5). For code generation tasks, decoder-only models take some pre-encoded code representation and learn to decode, i.e., synthesize next token sequences. Typically, these models use causal language modeling, i.e., generate the tokens conditioned on the previous token sequences. Thus, decoder-only models are a natural fit for code completion tasks where the previous code context is given and the model is expected to generate the next tokens. In contrast, encoder-decoder based code generation models are typically trained to learn to reconstruct the original code sequence that is corrupted using an arbitrary noise function. Therefore, such models do not naturally fit the code completion tasks but can be effective when fine-tuned for code generation or summarization tasks.

Unfortunately, large Transformer-Based models use billions of parameters and may require trillions of operations for generating code. Model compression tackles this high cost of large models to enable their wider and easier adoption. Model compression is a class of techniques designed to reduce model size (i.e., bytes required to represent the model) and improve generation latency while maintaining minimum accuracy (i.e., ability to generate useful and correct code) degradation.

In some examples detailed herein, at least some model parameters are stored using a lesser precision format (e.g., an 8-bit integer, a 4-bit integer, an 8-bit floating-point value, etc.) rather than the typical 16-bit (e.g., FP16/BF16) or 32-bit (e.g., FP32) formats. This usage potentially reduces memory usage and I/O usage by multiple factors.

In some examples, data is subjected to quantized to utilize these smaller formats. Quantization refers to the conversion of a higher-precision tensors (e.g., FP32, FP16, or BF16) to tensors with less precision (e.g., 8-bit integer values, 4-bit integer values, or 8-bit floating point values). Given a matrix W, a basic quantizer Q(•) uses scale and rounding operations to get the quantized version of a matrix:

$$Q(W) = \frac{W_q}{s_w}, \text{ where } s_w = \frac{2^{B-1}}{\alpha_w} \text{ and } W_q = \text{round}(s_w W)$$

In this example, $\alpha_w$ is the quantization rand and B is the bitwidth (e.g., 8 for INT8), $W_q$ is the quantized matrix, $s_w$ is the quantized scale, and Q(W) is the quantized approximation of the matrix W.

In some examples, to dequantize means to go from INT32 (or FP32) to FP16 or BF16. In some examples, to quantize means to go from FP32, FP16, or BF16 to INT8, INT4, or FP8. Note that in some examples, lower-precision FP or integer yield higher throughputs. Note that discussions below with respect to INT8 are applicable to other formats such as INT4 and/or FP8.

In some examples, some operations that are performed in a large language model are fused. Operations of a deep large language model can be broadly classified into general matrix multiplications (GEMMs), reduction operations, and element-wise operations. Typically, GEMMs are followed by series of element wise operations (such as element wise additions, element wise multiplications, and activation functions such as a rectified linear unit (ReLU) or a Gaussian error linear unit (GeLU) or one or more reductions (operations such as normalization layer). To date implementations have not fused the element wise operations thus resulting in repeated read and write of the same scalar for each element-wise operations. Furthermore, many of the element-wise operations can be applied outputs of GEMMs before storing them in the memory. In particular, in at least some examples, dequantize and quantize operations are fused with element-wise operations at the end and beginning of each GEMM. This avoids memory overheads that are associated with these operations and yields a speedup due to the faster computations speed of lower precision operations and faster memory fetch due to the reduction in bits read from memory.

FIG. 1 illustrates examples of one or more services that are provided as a part of a provider network's offerings. One or more of these services support the ability to use quantization techniques and/or fusion techniques as detailed herein. The code generation recommendation service 110 generates a computer code in response to a human written specification (commonlthealled prompt). This service allows for the automation of aspects of the software development process and improves developers' productivity (and, in some examples, improves the security, reliability, etc. of the code). In some examples, the code generation recommendation service 110 uses one or more trained Transformer-based models 112 such as PLMs to generate code from a prompt. These Transformer-based models 112 utilize quantization techniques and/or fusion as detailed herein. In some examples, other trained model(s) 114 (that is non-Transformer-based models) are used to generate code based on a prompt.

In some examples, the code generation recommendation service 110 runs on a graphical processing unit (GPU), a matrix accelerator (e.g., FPGA, matrix co-processor, etc.), a central processing unit (CPU), and/or a combination thereof.

The code generation recommendation service 110 typically couples to, or is a part of, an integrated development environment (IDE). In this illustration, there is an IDE service 120(A) provided by the provider network 100 and/or an external IDE service 120(B) that is installed on a user device 130. Either IDE 120(A) or 120(B) allows for a user using user device 130 to prompt either the code generation recommendation service 110 or a code generation component 140 (that utilizes trained Transformer-based model(s) 142 and/or other trained models 144 that utilize quantization techniques and/or fusion as detailed herein) to generate code from the prompt.

Other services such as chatbot service 150, search service 152, and/or a model compression deploy service 154 may use the quantization techniques and/or fusion techniques detailed herein. For example, a LLM of the chatbot service 150 may be quantized and/or fused. The model compression deployment service 154 includes a quantization component 156 and fusing component 158 to evaluate models and quantize parameters and/or fuse some operations that would normally require loading and storing to memory. Note model compression 164 may also be performed in a user device 130.

The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

FIGS. 2-6 illustrate examples of Transformer-based models and/or aspects thereof. Note that each box in these illustrations typically corresponds to a kernel call in some examples.

Figure 2:
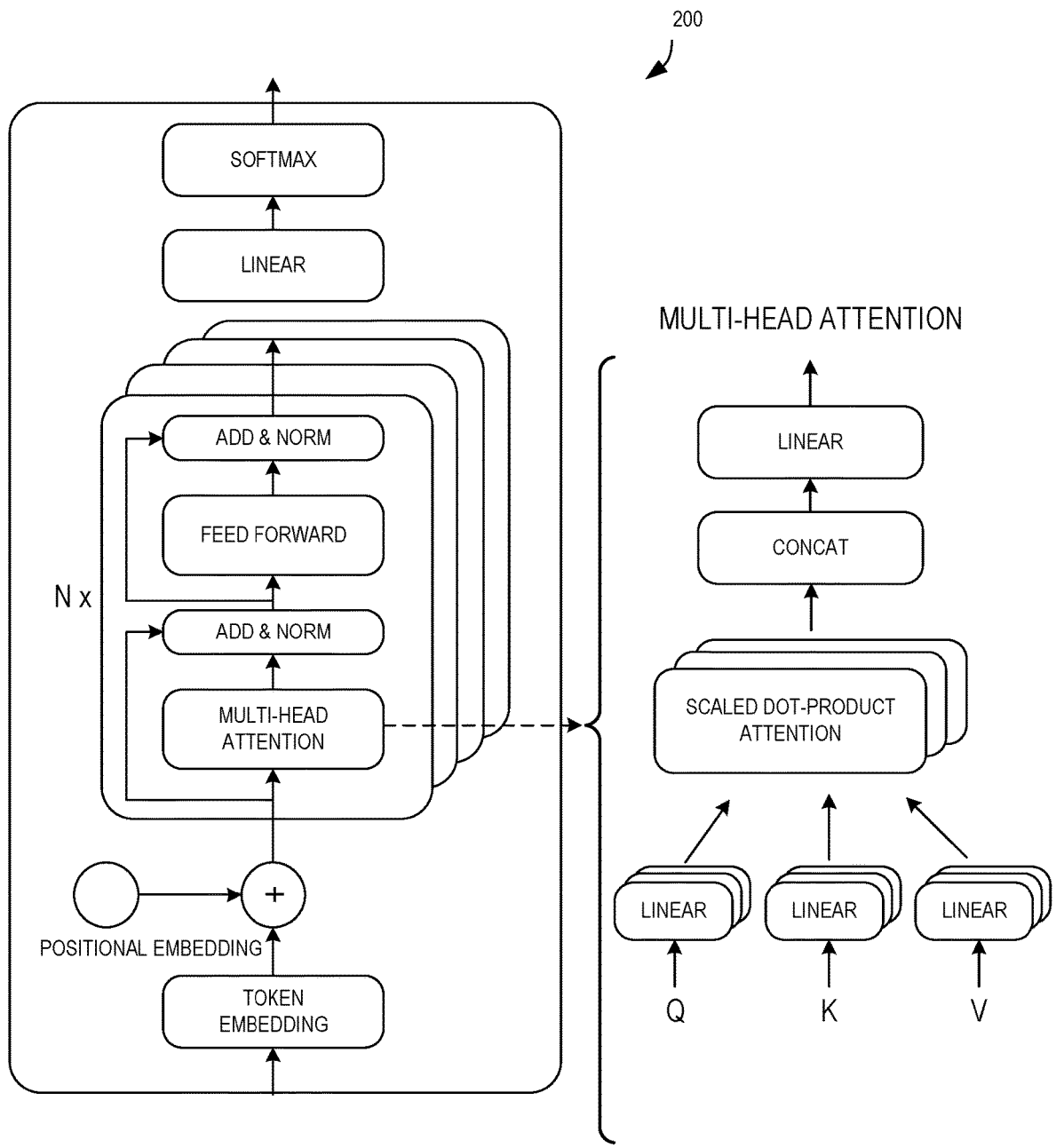
FIG. 2 illustrates examples of a Transformer model structure.

FIG. 2 illustrates examples of a Transformer model structure. As shown, a Transformer model utilizes a plurality of linear layers for the multi-head attention and the feed-forward layer also includes one or more linear layers (e.g., linear transformation, followed by ReLU, which is followed by another linear transformation). In some examples, one or more of the linear layers are quantized.

In some examples, one or more element-wise operations of a Transformer are fused with GEMM operations of the previously described Transformer variants. In some examples, an INT8 GEMM kernel call (e.g., MatMul+Scale) is fused to do INT8 GEMM followed by dequantization, scaling, and quantization operations. In some examples, a layer normalization kernel call (e.g., Norm or LayerNorm in the previous figures) is fused to do dequantization, followed by layer normalization operations, which are followed by quantization operations. In some examples, a quantized QKV and sigmoid kernel (e.g., Dquant+Quant or Dquantized+Bias add in the previous figures) is fused to do a series of computations for QKV computations. In some examples, an INT8 GEMM kernel call is fused to do dequantization followed by INT8 GEMM.

Figure 3:
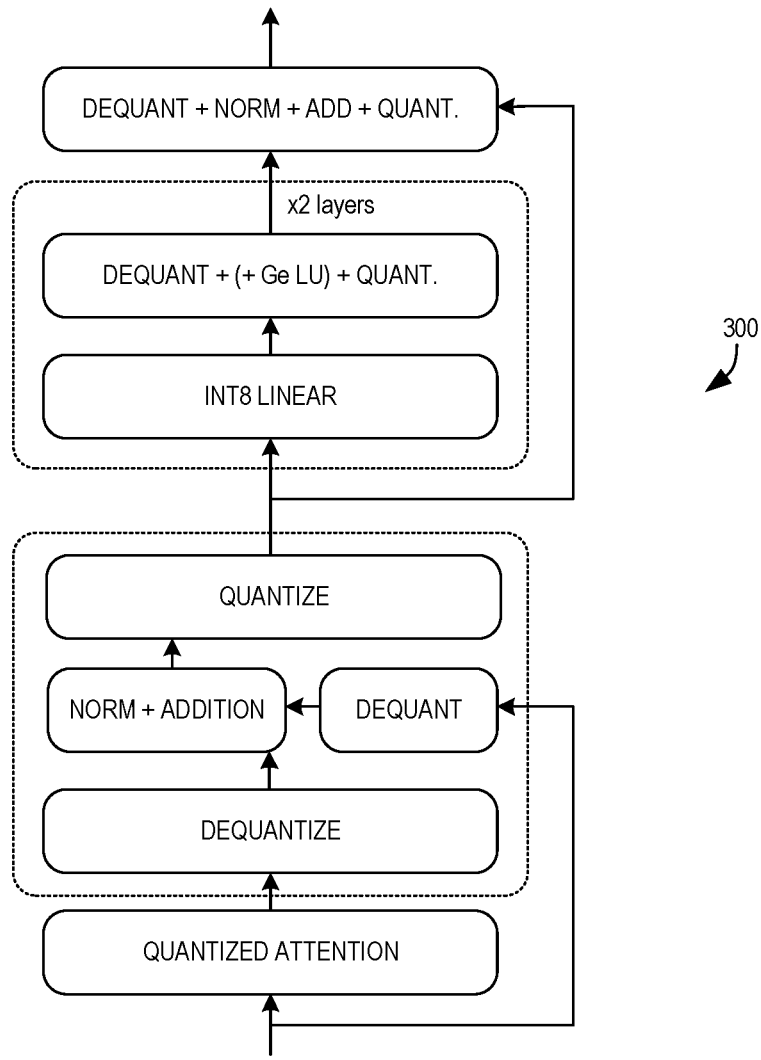
FIG. 3 illustrates examples of a Transformer block that utilizes quantization.

FIG. 3 illustrates examples of a Transformer block that utilizes quantization. In this illustration, the Transformer block aligns with a Bidirectional Encoder Transformer (BERT) block. BERT only implements the encoder portion of Transformer.

Figure 4:
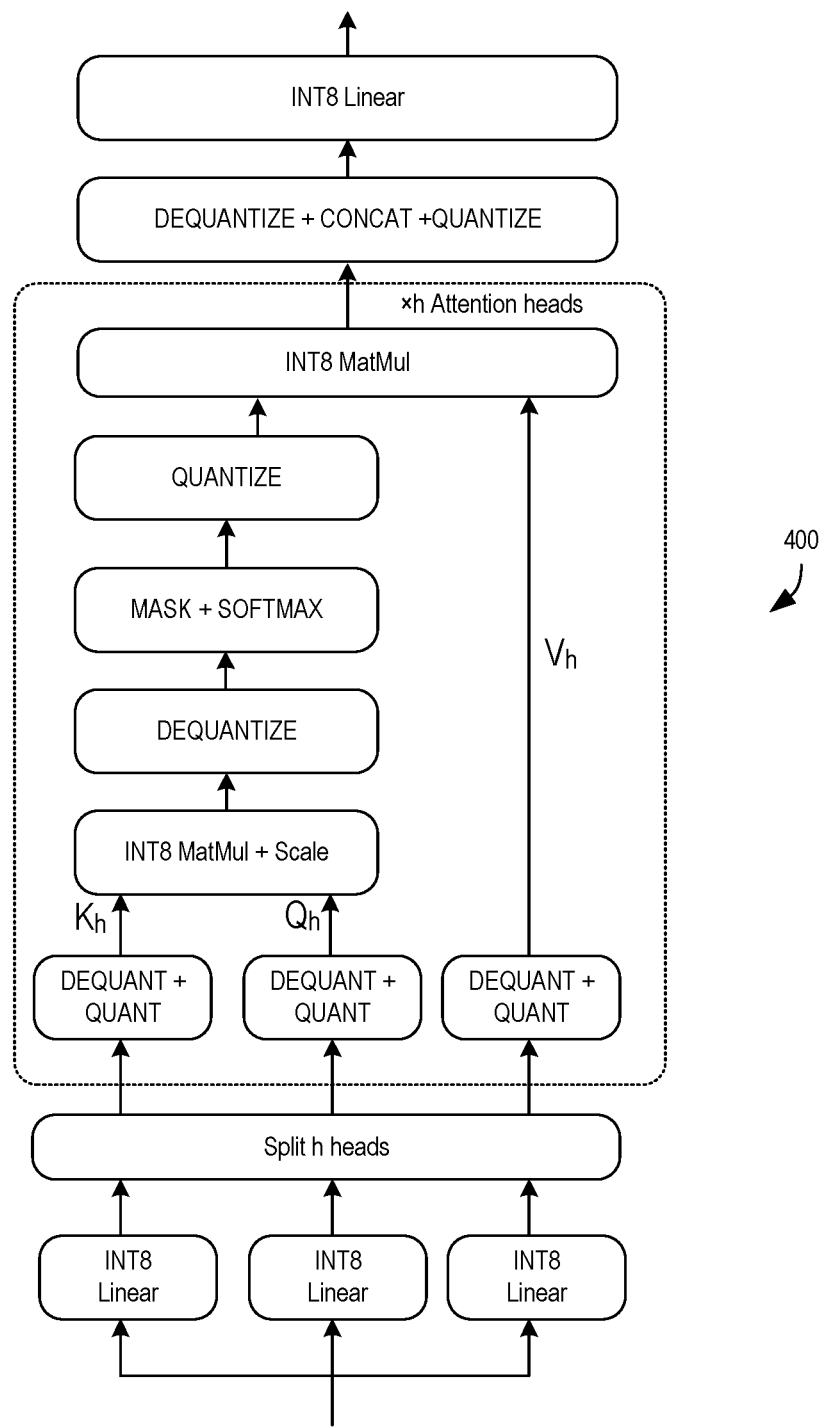
FIG. 4 illustrates examples of a quantized attention block.

As shown quantization may be applied during the attention portion (FIG. 4 illustrates examples of a quantized attention block) and post the attention blocks. In particular, the output of the quantized attention block is still quantized and will go through a dequantization prior to being subjected to normalization of the attention output added to the layer input. The output of the normalization is quantized before being fed to the feedforward layer.

The feedforward layer of has a linear layer followed by a GeLU layer. As shown, the linear layer uses the quantized values (e.g., in INT8, etc.). The output of the linear layer is to be dequantized, then GeLU applied, and the output of GeLU quantized.

Another layer of normalization is applied to the output of the feedforward layer (e.g., dequantizing the input, followed by a normalization of the attention output added to the layer input, which is followed by another quantization.

FIG. 4 illustrates examples of a quantized attention block. As shown in FIG. 2, the input to the multiheaded attention block comprises INT8 Q, K, and V values that are subjected to a linear layer. In this example, the output of the linear layers and matrix multiplications are 32-bit values (e.g., INT32).

The output of each linear layer is provided to a plurality of attention heads which perform scaled dot product attention. These heads dequantize the INT32 values to FP16 and then quantize the FP16 values to INT8. An INT8 GEMM operation is performed on the quantized KT and Q values. The result of the GEMM operation is then scaled. In some examples, the result of the GEMM and scale is an INT32 value which is dequantized for an optional masking and softmax application. The result of the softmax is quantized to be INT8 and then multiplied by the INT8 V values.

The INT32 values from the attention heads are dequantized to FP16, concatenated, and then quantized to INT8 values which are subjected to a linear layer.

Figure 5:
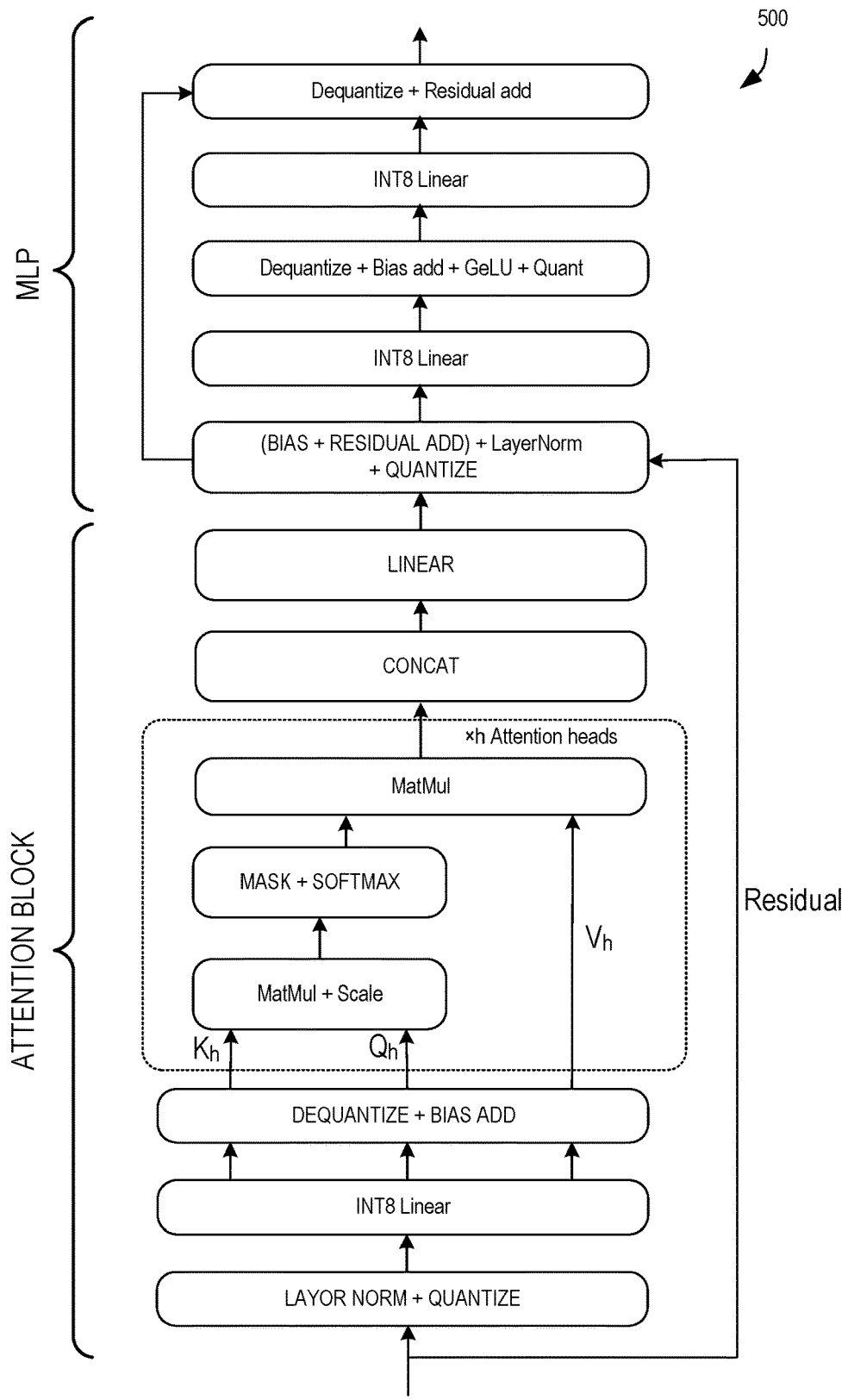
FIG. 5 illustrates examples of a Transformer-based architecture that includes an attention block whose output is provided to a multilayer perceptron.

FIG. 5 illustrates examples of a Transformer-based architecture that includes an attention block whose output is provided to a multilayer perceptron. The attention block normalizes and quantizes embedded input values.

A QKV GEMM input normalization section performs layer normalization of the embedded input and quantizes the normalized output to INT8. The quantized, normalized INT8 output is subjected to a linear layer to generate separate Q, K, and V 32-bit INT values. The 32-bit values are dequantized to 16-bit and a bias is added (e.g., a Q-bias, a K-bias, and a V-bias). The biased Q, K, and V are subjected to a plurality of attention heads.

Each attention head performs 16-bit GEMM and scales the result. The scaled values are subjected to an optional masking and softmax application. The result of the softmax then multiplied by the 16-bit V values to form an attention context.

The attention context is concatenated and subjected to a linear layer to generate an attention output.

A bias is added to the attention output and a residual from the input into the QKV GEMM input normalization section. A layer normalization is then applied and the result of the normalization is quantized to INT8. A linear feed-forward layer is applied to the INT8 values and the output of this layer is dequantized (back to FP16), a bias added, GeLU applied, and the result of the GeLU application quantized to INT8. Another INT8 linear layer is applied which generates an INT32 result to be dequantized and a residual added.

Figure 6:
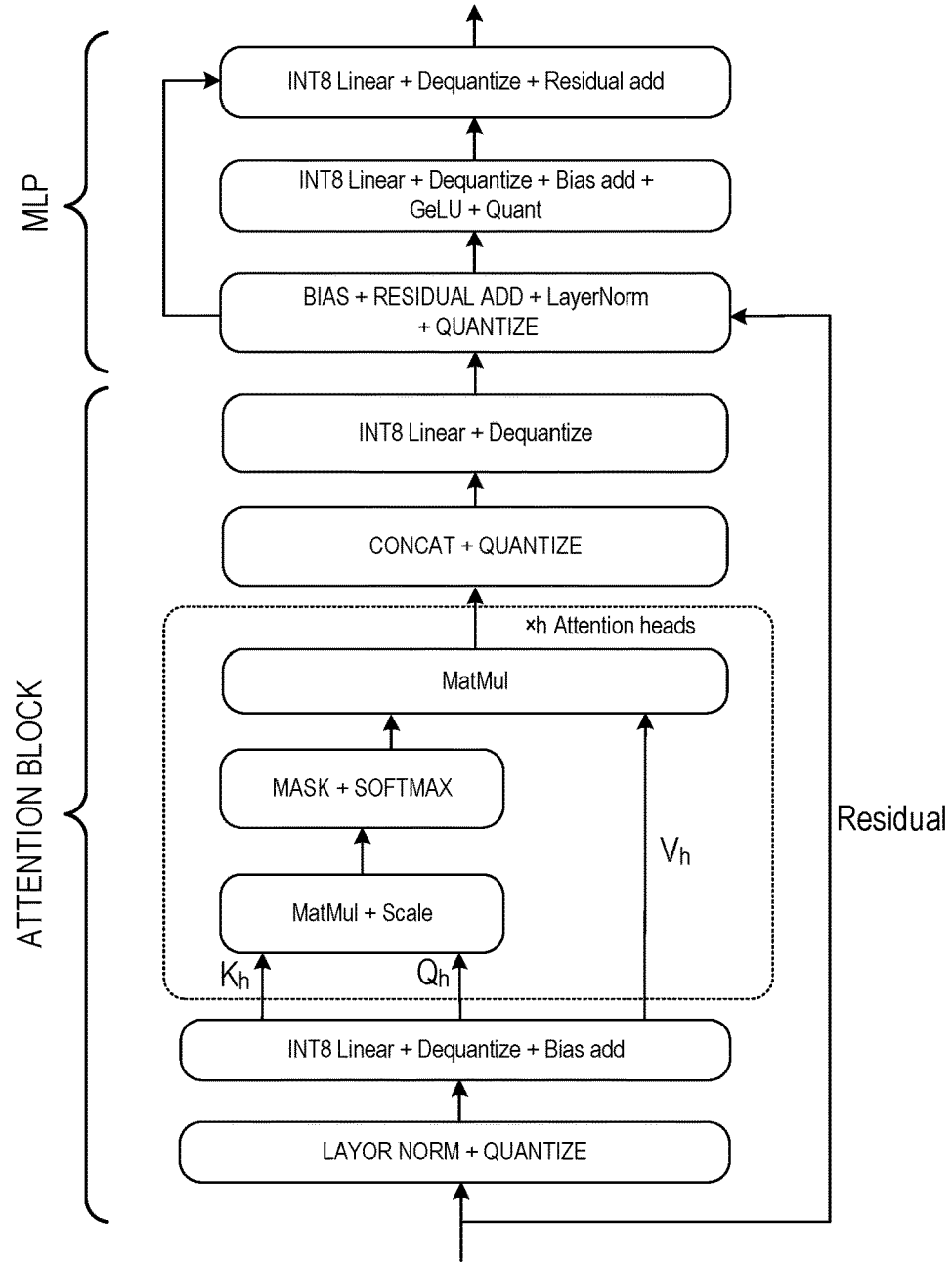
FIG. 6 illustrates examples of a Transformer-based architecture that includes an attention block whose output is provided to a multilayer perceptron.

FIG. 6 illustrates examples of a Transformer-based architecture that includes an attention block whose output is provided to a multilayer perceptron. The attention block normalizes and quantizes embedded input values.

A QKV GEMM input normalization section performs layer normalization of the embedded input and quantizes the normalized output to INT8. The quantized, normalized INT8 output is subjected to a linear layer to generate separate Q, K, and V 32-bit INT values that are dequantized to 16-bit and a bias is added (e.g., a Q-bias, a K-bias, and a V-bias). Note that the dequantize operation is fused with the element-wise operations of the bias additions. The output of this section is provided to a plurality of attention heads.

Each attention head performs 16-bit GEMM and scales the result. The scaled values are subjected to an optional masking and softmax application. The result of the softmax then multiplied by the 16-bit V values to form an attention context.

The attention context is concatenated and then quantized. The concatenated, quantized attention context is subjected to an INT8 linear layer whose output is dequantized to generate an attention output.

A bias is added to the attention output and a residual from the input into the QKV GEMM input normalization section. A layer normalization is then applied, and the result of the normalization is quantized to INT8. Note that the quantize operation is fused with the element-wise operations of the bias and residual additions.

An INT8 linear feed-forward layer is then applied, and the output of this layer is dequantized (back to FP16), a bias added, GeLU applied, and the result of the GeLU application quantized to INT8. Note that the dequantize and quantize operations are fused with the element-wise operations of the bias additions.

Another INT8 linear layer is applied which generates an INT32 result to be dequantized and a residual added. Note that the dequantize and quantize operations are fused with the element-wise operations of the residual additions.

In some examples, quantization may come in one of two flavors—a per-tensor quantization and a per-column quantization. This primarily pertains to the granularity of the scales during weight quantization. Per-tensor quantization uses a single scaling factor for the weight matrix and per-column quantization will use a scale for every column.

Figure 7:
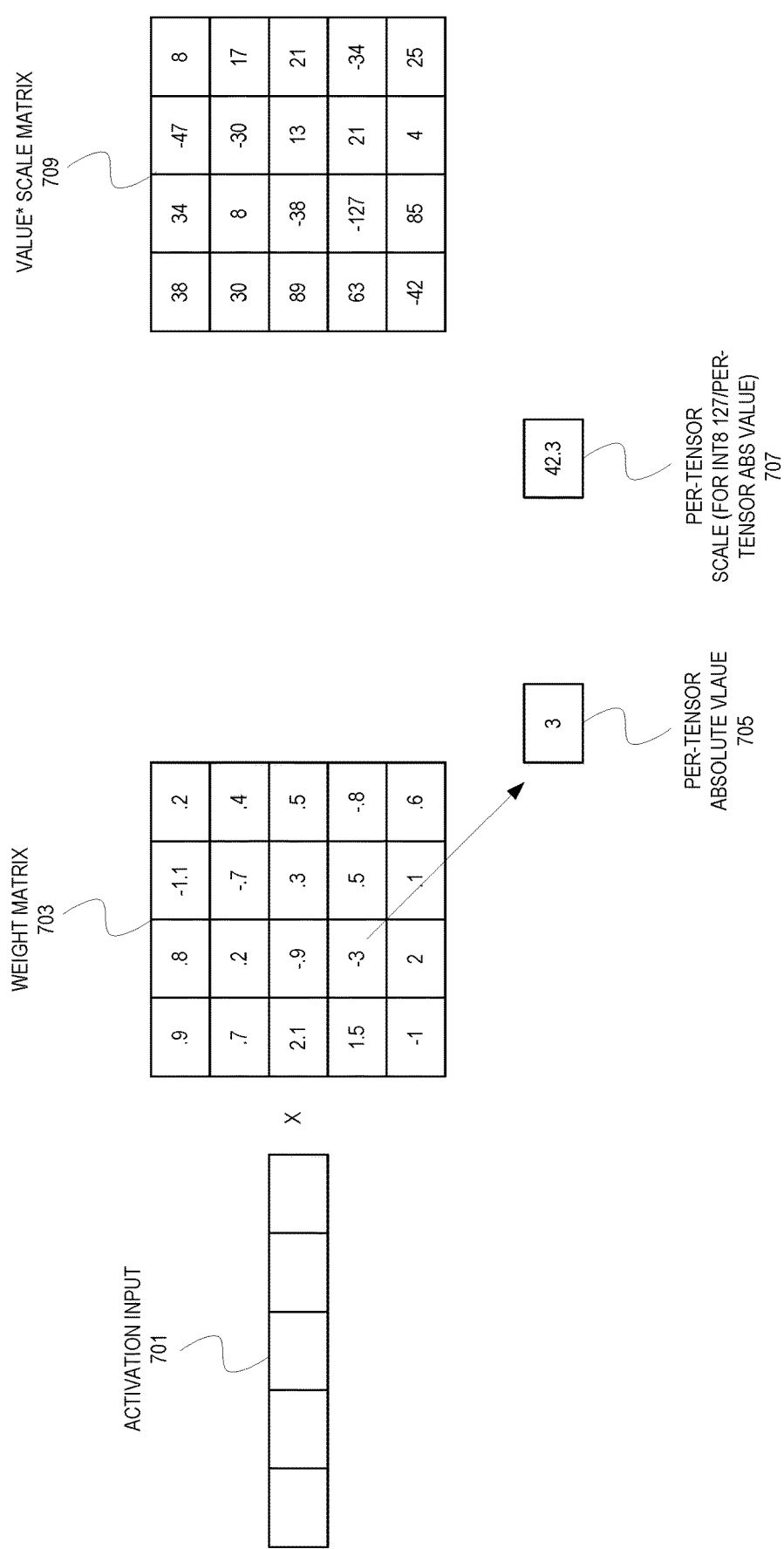
FIG. 7 illustrates examples of per-tensor quantization.

FIG. 7 illustrates examples of per-tensor quantization. As shown, an activation input 701 is to be multiplied by a weight matrix 703. However, the weight matrix 703 utilizes higher-precision values than are needed. Instead, a quantized matrix (shown as value*scale matrix 709) is to be used. In this example, the quantized matrix is generated by multiplying the weight matrix 703 by a per-tensor scale 707 (and, in some examples using integers, rounding the result). The per-tensor scale (a single scaling factor) is based on a per-tensor maximum absolute value 705. In particular, the scale factor is 127/quantization range (which is the largest absolute value 705 of weight matrix 703).

Figure 8:
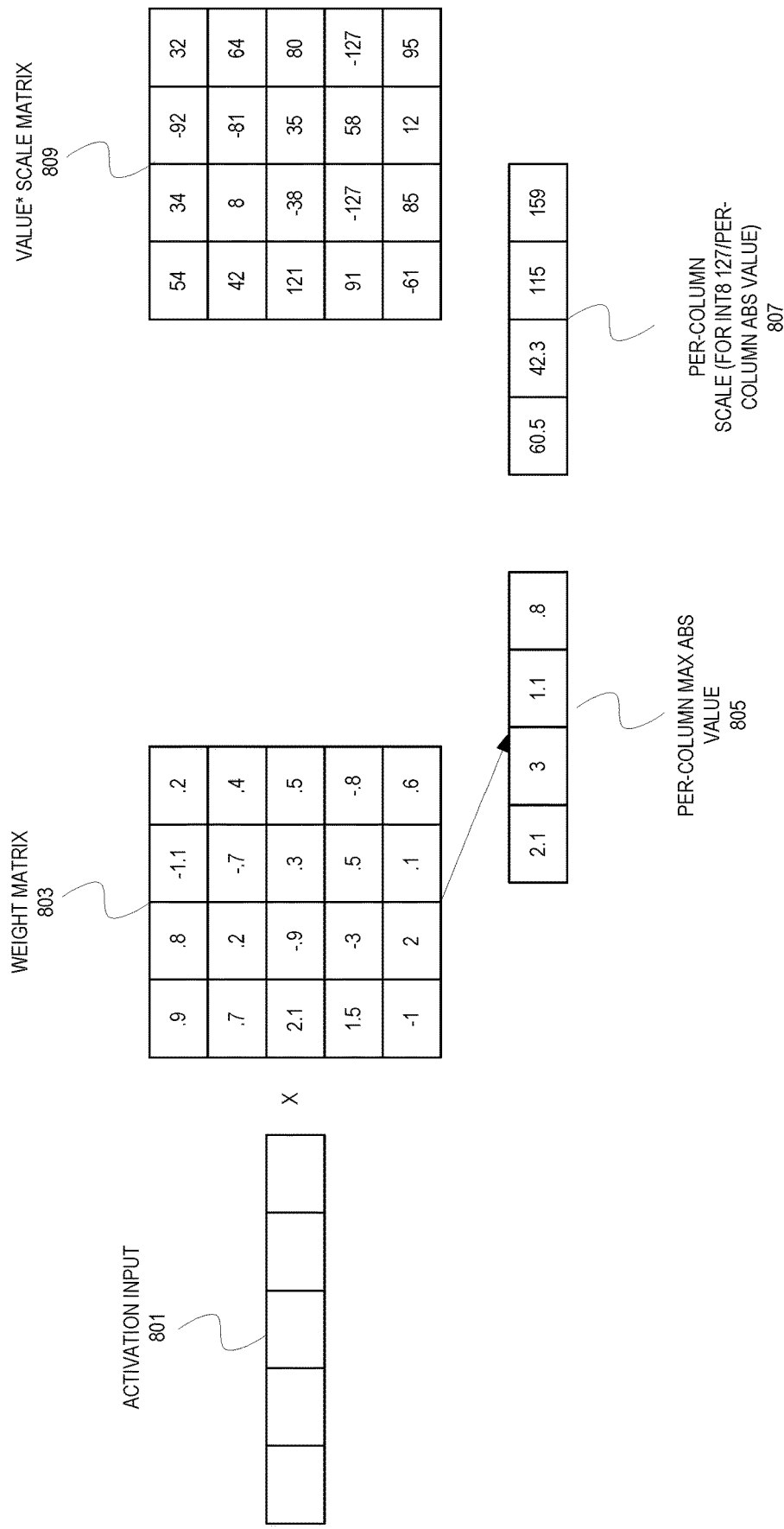
FIG. 8 illustrates examples of per-column quantization.

FIG. 8 illustrates examples of per-column quantization. As shown, an activation input 801 is to be multiplied by a weight matrix 803. However, the weight matrix 803 utilizes higher-precision values than are needed. Instead, a quantized matrix (shown as value*scale matrix 709) is to be used. In this example, the quantized matrix is generated by multiplying the weight matrix 803 by a per-column scale 807 (and, in some examples using integers, rounding the result). The per-column scale 807 is based on a per-column maximum absolute value 805. In particular, the per column scale factor is 127/quantization range.

In some examples, dynamic quantization is used. For dynamic quantization a clip range (a) and scale parameter(s) are determined on the fly for activations to minimize quantization noise where possible. One could typically use the maximum (absolute) value of the activation tensors as the clip range for each input. However, determining the clip range dynamically may incur an additional scanning cost to find the max value.

Figure 9:
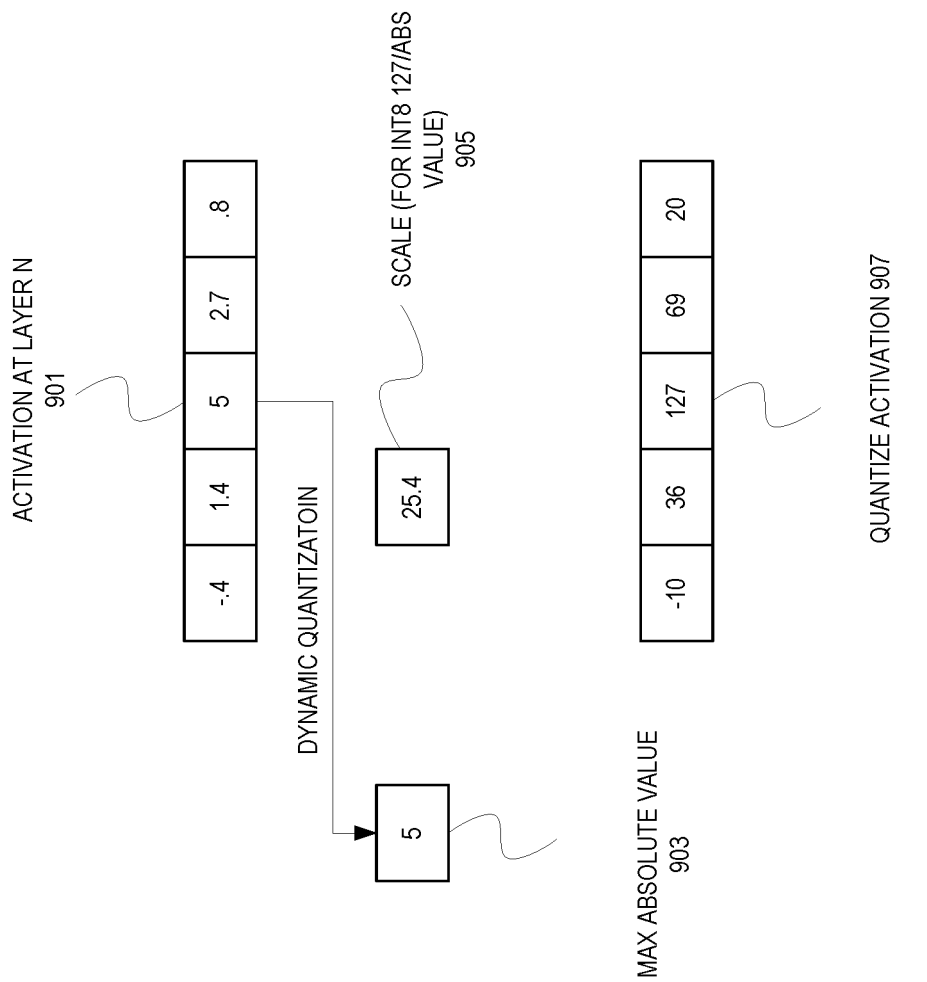
FIG. 9 illustrates examples of dynamic quantization.

FIG. 9 illustrates examples of dynamic quantization. As shown, an activation vector at layer N 901 includes a plurality of values. A maximum absolute value 903 is found from the activation layer 901 and that value is used to generate a scale 905. The activation layer 901 is multiplied by the scale and the resultant values are rounded to generate a quantized activation 907.

In some examples, static quantization is used. For static quantization the same pre-determined scale through so-called calibration on samples by minimizing certain loss (e.g., MSE/Entropy) between original activation and quantized activations. Static quantization might be susceptible to higher quantization noise though it would lower computational cost during inference.

Figure 10:
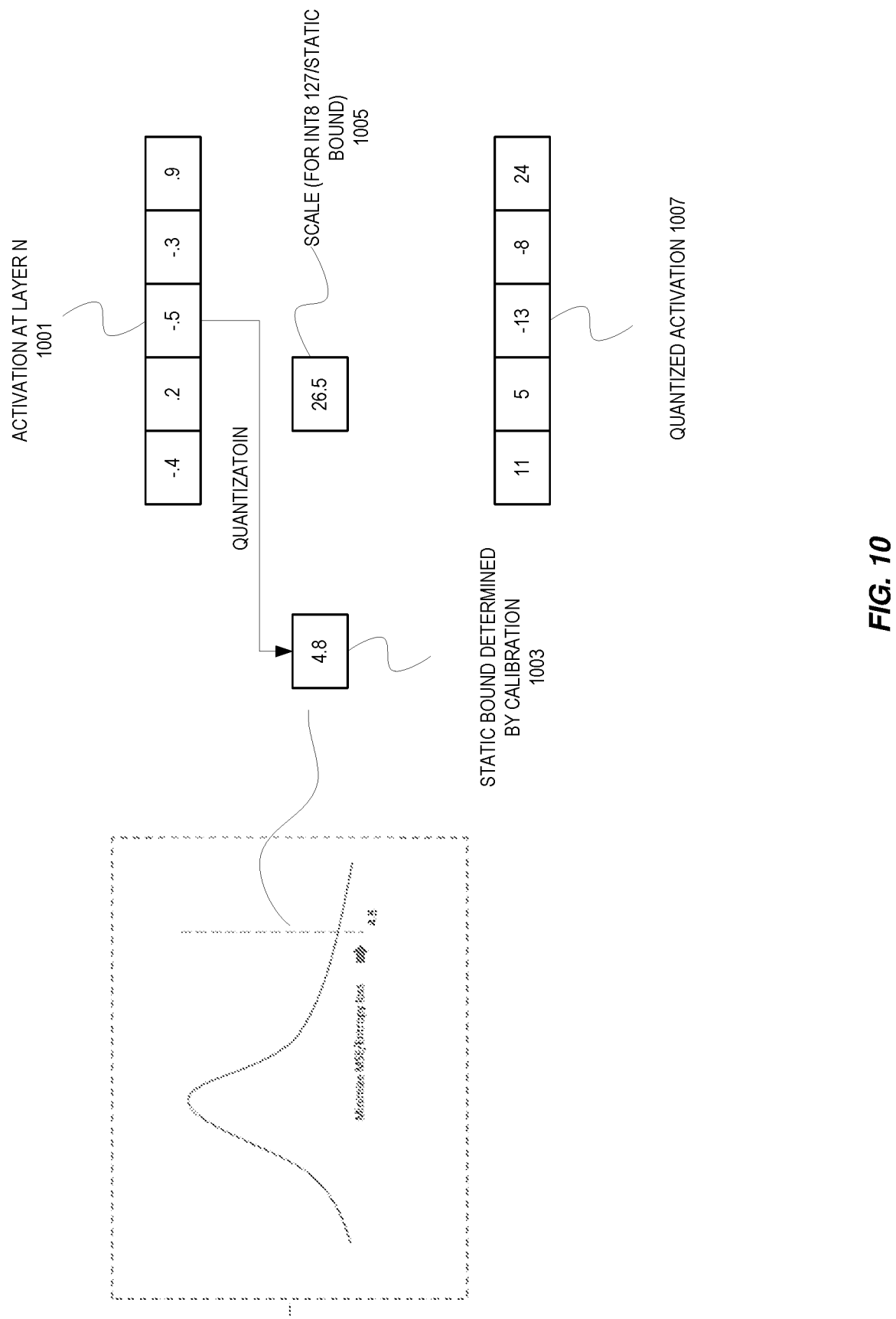
FIG. 10 illustrates examples of static quantization.

FIG. 10 illustrates examples of static quantization. As shown, an activation vector at layer N 1001 includes a plurality of values. A static bound value 1003 is found from calibration on a small amount of data by minimizing the MSE/Entropy loss value between the original activation layer and quantized activations. That static bound value is used to generate a scale 1005. The activation layer 1001 is multiplied by the scale and the resultant values are rounded to generate a quantized activation 1007.

Figure 11:
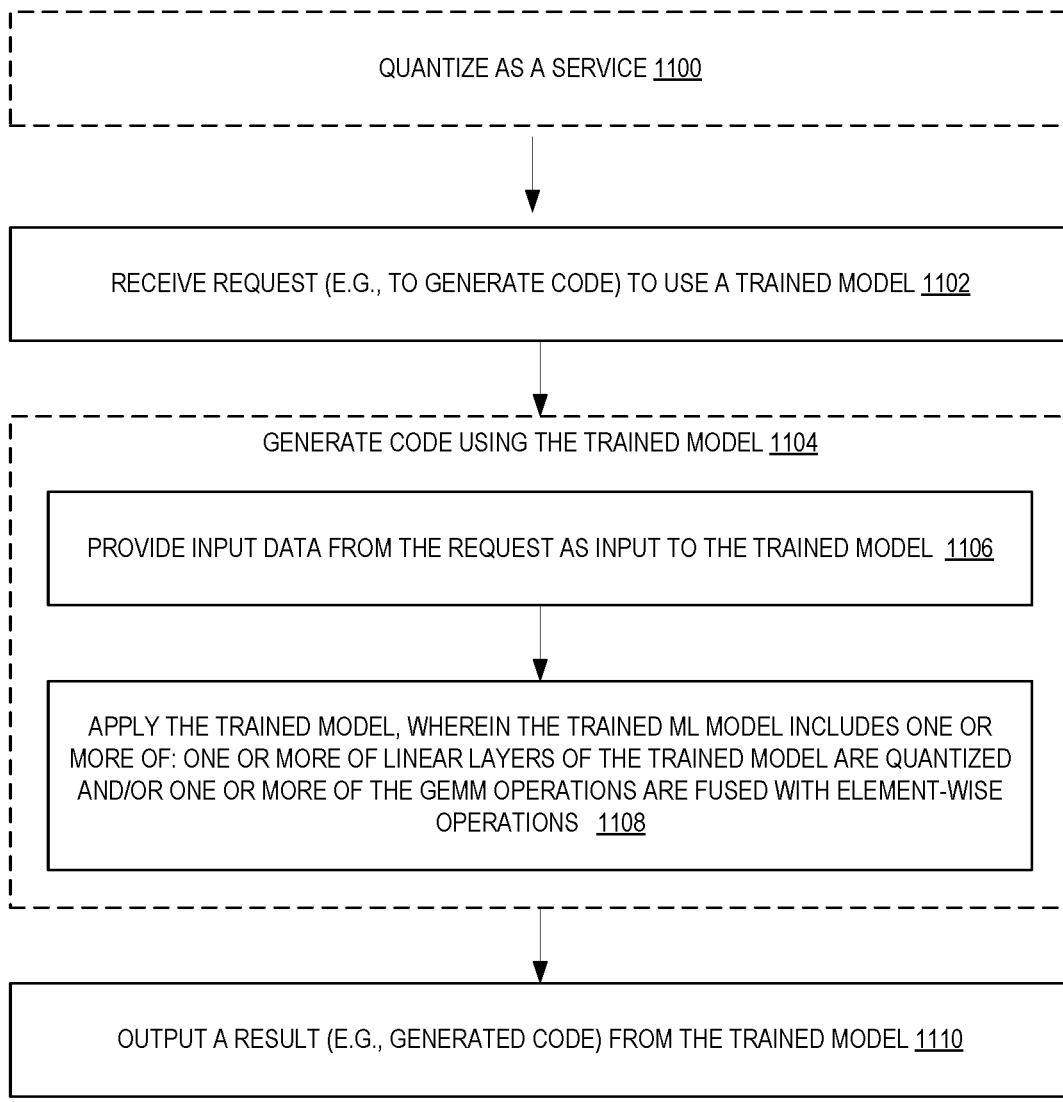
FIG. 11 is a flow diagram illustrating operations of a method for using language model using at least GEMM and element-wise fusion according to some examples.

FIG. 11 is a flow diagram illustrating operations of a method for using and/or modifying a model using at least GEMM and element-wise fusion according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the code generation recommendation service 110 or code generation recommendation component 140 of the other figures.

In some examples, aspects of a model are quantized as a service at 1100. That is a request to quantize parameters of a model is received and those parameters are quantized. In some examples, the request includes an identification the model, the parameters to quantize, and/or the level of quantization (e.g., what type and size of data element format to use). In some examples, the request indicates the model, and the service performs the quantization by testing various quantization alterations.

A request to use a trained model is received at 1102. In some examples, this request is a request to generate code based on a natural language statement (input text) of the request. In some examples, the request includes a code fragment to complete. In some examples, one or more characters are used to indicate the request. For example, a # may be used to indicate the text after the # is a request ("# sort a list of integers by the number of digits they have"). In some examples, the request is received from an IDE. In some examples, the request is input into an IDE. Note that the input as provided by the request may include text, audio, video, or image data or a reference to such data.

In some examples, code will be generated based on the request at 1104. The code being an output of the trained language model.

At 1106 the input data from the request is provided as an input to the trained model. In some examples, some pre-processing is performed on the data first (e.g., cleaning up spelling, cropping an image, etc.).

The trained model to the input text at 1108. The application of the trained model includes fusing one or more matrix multiplication operations with element-wise operations and/or using quantization in at least one linear layer of the trained language model. As noted above there are different types of quantization (per-tensor, per-column, dynamic, static, INT8, FP8, INT4, etc.) that may be applied. In some examples, the request includes an indication of what type of quantization to use. In some examples, the request merely indicates that quantization is to be used.

A result from the trained model is output at 1110. In some examples, the output is code.

Figure 12:
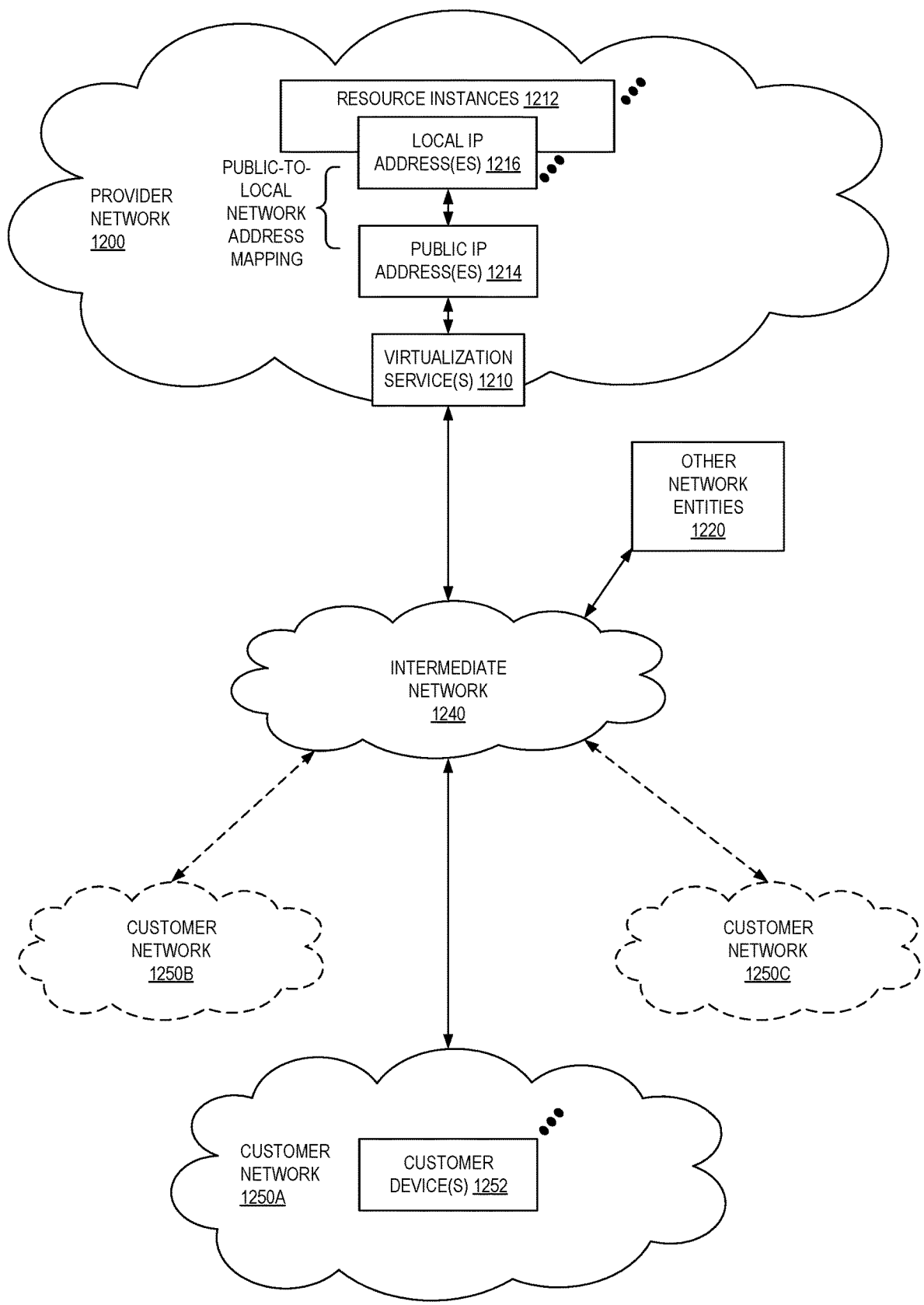
FIG. 12 illustrates an example provider network environment according to some examples.

FIG. 12 illustrates an example provider network (or "service provider system") environment according to some examples. A provider network 1200 can provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 can be associated with the resource instances 1212; the local IP addresses are the internal network addresses of the resource instances 1212 on the provider network 1200. In some examples, the provider network 1200 can also provide public IP addresses 1214 and/or public IP address ranges (e.g., Internet Protocol version 4 (IPv4) or Internet Protocol version 6 (IPv6) addresses) that customers can obtain from the provider 1200.

Conventionally, the provider network 1200, via the virtualization services 1210, can allow a customer of the service provider (e.g., a customer that operates one or more customer networks 1250A-1250C (or "client networks") including one or more customer device(s) 1252) to dynamically associate at least some public IP addresses 1214 assigned or allocated to the customer with particular resource instances 1212 assigned to the customer. The provider network 1200 can also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of the customer network(s) 1250A-1250C can, for example, implement customer-specific applications and present the customer's applications on an intermediate network 1240, such as the Internet. Other network entities 1220 on the intermediate network 1240 can then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 can be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1200; a customer can then assign their allocated public IP addresses to particular resource instances allocated to the customer. These public IP addresses can be referred to as customer public IP addresses, or simply customer IP addresses.

Instead of being assigned by the provider network 1200 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
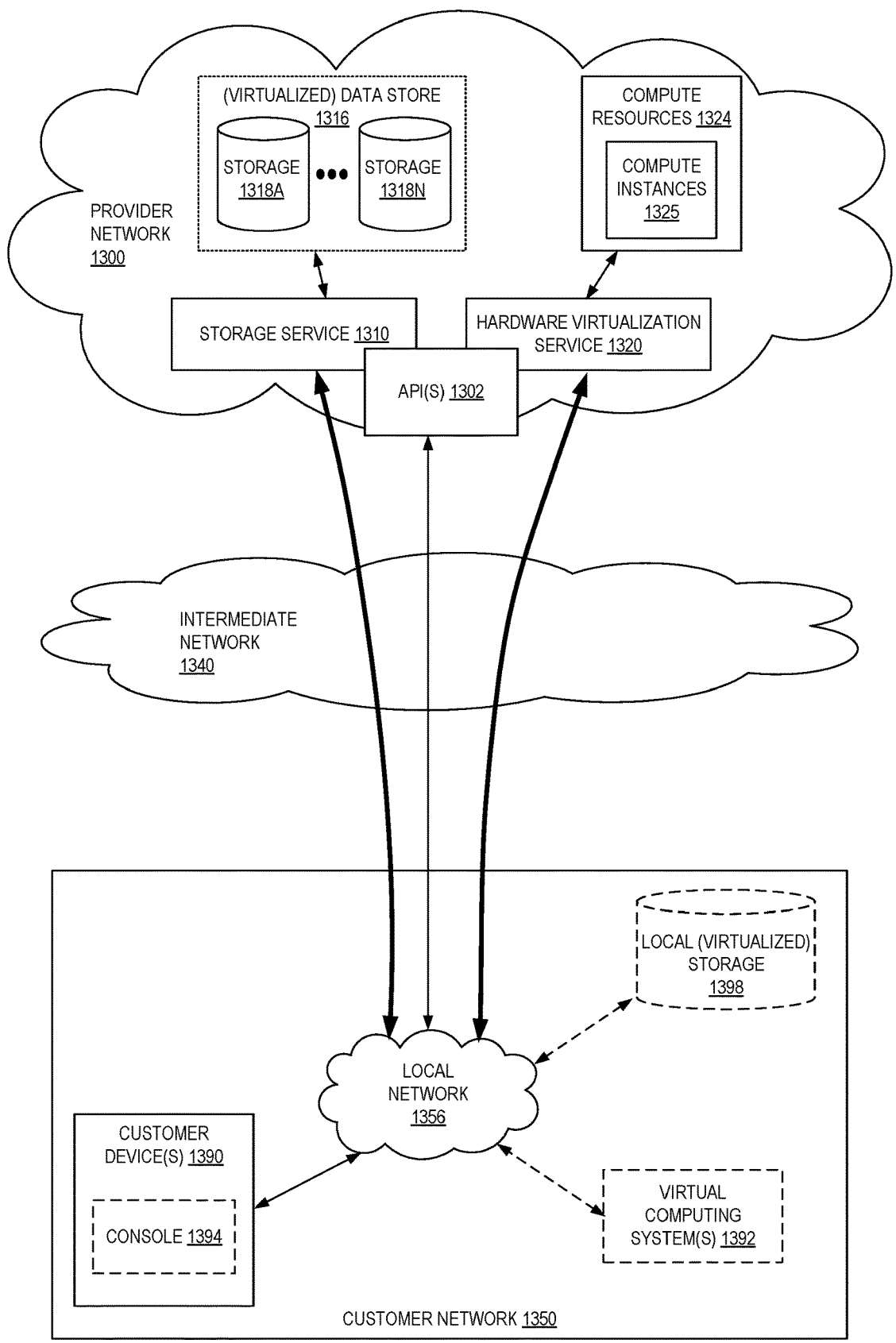
FIG. 13 is a block diagram of an example provider network that provides a storage service and a hardware virtualization service to customers according to some examples.

FIG. 13 is a block diagram of an example provider network environment that provides a storage service and a hardware virtualization service to customers, according to some examples. A hardware virtualization service 1320 provides multiple compute resources 1324 (e.g., compute instances 1325, such as VMs) to customers. The compute resources 1324 can, for example, be provided as a service to customers of a provider network 1300 (e.g., to a customer that implements a customer network 1350). Each computation resource 1324 can be provided with one or more local IP addresses. The provider network 1300 can be configured to route packets from the local IP addresses of the compute resources 1324 to public Internet destinations, and from public Internet sources to the local IP addresses of the compute resources 1324.

The provider network 1300 can provide the customer network 1350, for example coupled to an intermediate network 1340 via a local network 1356, the ability to implement virtual computing systems 1392 via the hardware virtualization service 1320 coupled to the intermediate network 1340 and to the provider network 1300. In some examples, the hardware virtualization service 1320 can provide one or more APIs 1302, for example a web services interface, via which the customer network 1350 can access functionality provided by the hardware virtualization service 1320, for example via a console 1394 (e.g., a web-based application, standalone application, mobile application, etc.) of a customer device 1390. In some examples, at the provider network 1300, each virtual computing system 1392 at the customer network 1350 can correspond to a computation resource 1324 that is leased, rented, or otherwise provided to the customer network 1350.

From an instance of the virtual computing system(s) 1392 and/or another customer device 1390 (e.g., via console 1394), the customer can access the functionality of a storage service 1310, for example via the one or more APIs 1302, to access data from and store data to storage resources 1318A-1318N of a virtual data store 1316 (e.g., a folder or "bucket," a virtualized volume, a database, etc.) provided by the provider network 1300. In some examples, a virtualized data store gateway (not shown) can be provided at the customer network 1350 that can locally cache at least some data, for example frequently accessed or critical data, and that can communicate with the storage service 1310 via one or more communications channels to upload new or modified data from a local cache so that the primary store of data (the virtualized data store 1316) is maintained. In some examples, a user, via the virtual computing system 1392 and/or another customer device 1390, can mount and access virtual data store 1316 volumes via the storage service 1310 acting as a storage virtualization service, and these volumes can appear to the user as local (virtualized) storage 1398.

While not shown in FIG. 13, the virtualization service(s) can also be accessed from resource instances within the provider network 1300 via the API(s) 1302. For example, a customer, appliance service provider, or other entity can access a virtualization service from within a respective virtual network on the provider network 1300 via the API(s) 1302 to request allocation of one or more resource instances within the virtual network or within another virtual network.

Illustrative Systems

Figure 14:
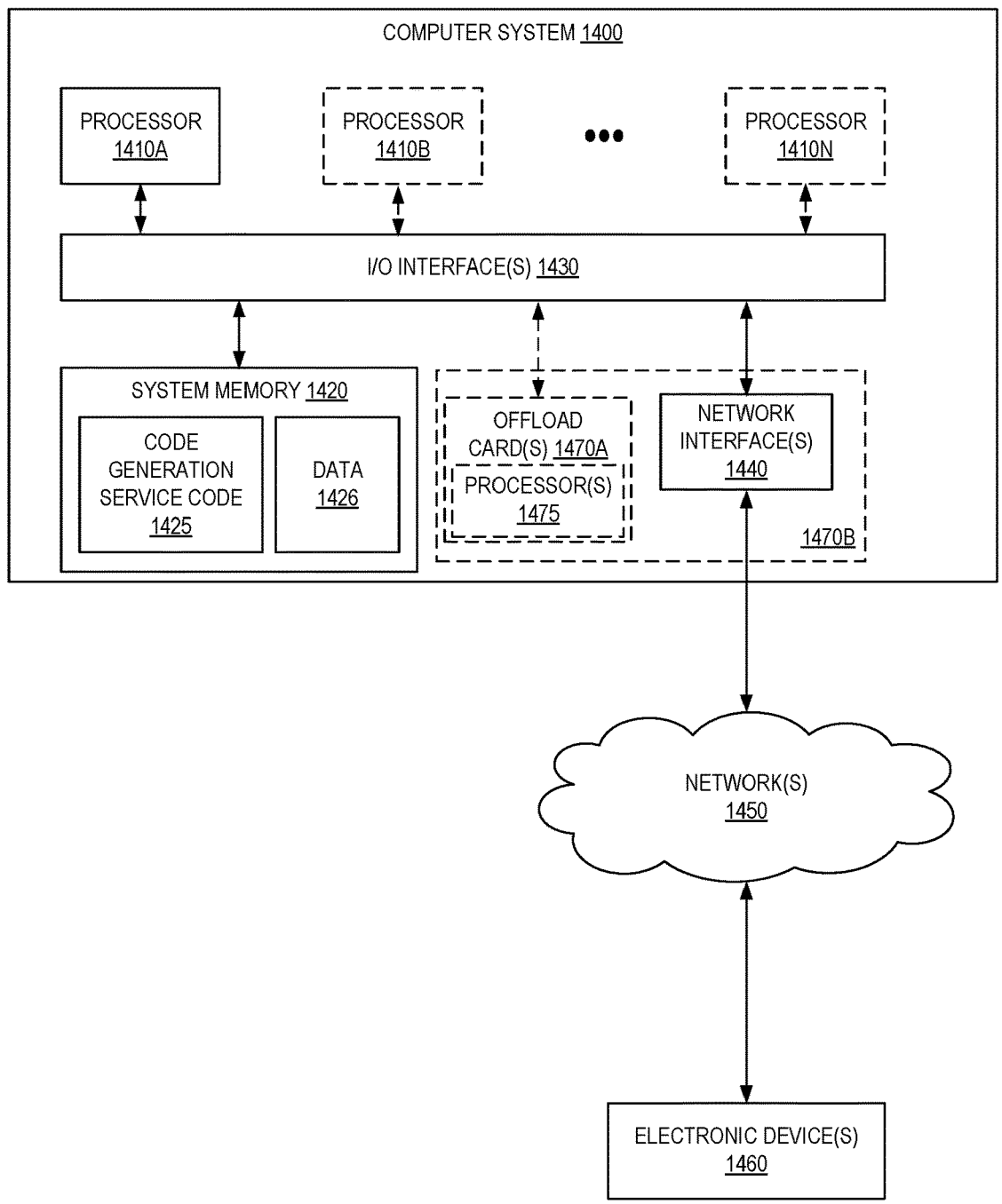
FIG. 14 is a block diagram illustrating an example computer system that can be used in some examples.

In some examples, a system that implements a portion or all of the techniques described herein can include a general-purpose computer system, such as the computer system 1400 illustrated in FIG. 14, that includes, or is configured to access, one or more computer-accessible media. In the illustrated example, the computer system 1400 includes one or more processors 1410 coupled to a system memory 1420 via an input/output (I/O) interface 1430. The computer system 1400 further includes a network interface 1440 coupled to the I/O interface 1430. While FIG. 14 shows the computer system 1400 as a single computing device, in various examples the computer system 1400 can include one computing device or any number of computing devices configured to work together as a single computer system 1400.

In various examples, the computer system 1400 can be a uniprocessor system including one processor 1410, or a multiprocessor system including several processors 1410 (e.g., two, four, eight, or another suitable number). The processor(s) 1410 can be any suitable processor(s) capable of executing instructions. For example, in various examples, the processor(s) 1410 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1410 can commonly, but not necessarily, implement the same ISA.

The system memory 1420 can store instructions and data accessible by the processor(s) 1410. In various examples, the system memory 1420 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1420 as code generation service code 1425 (e.g., executable to implement, in whole or in part, the code generation recommendation service 110) and data 1426.

In some examples, the I/O interface 1430 can be configured to coordinate I/O traffic between the processor 1410, the system memory 1420, and any peripheral devices in the device, including the network interface 1440 and/or other peripheral interfaces (not shown). In some examples, the I/O interface 1430 can perform any necessary protocol, timing, or other data transformations to convert data signals from one component (e.g., the system memory 1420) into a format suitable for use by another component (e.g., the processor 1410). In some examples, the I/O interface 1430 can include support for devices attached through various types of peripheral buses, such as a variant of the Peripheral Component Interconnect (PCI) bus standard or the Universal Serial Bus (USB) standard, for example. In some examples, the function of the I/O interface 1430 can be split into two or more separate components, such as a north bridge and a south bridge, for example. Also, in some examples, some or all of the functionality of the I/O interface 1430, such as an interface to the system memory 1420, can be incorporated directly into the processor 1410.

The network interface 1440 can be configured to allow data to be exchanged between the computer system 1400 and other devices 1460 attached to a network or networks 1450, such as other computer systems or devices as illustrated in FIG. 1, for example. In various examples, the network interface 1440 can support communication via any suitable wired or wireless general data networks, such as types of Ethernet network, for example. Additionally, the network interface 1440 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1400 includes one or more offload cards 1470A or 1470B (including one or more processors 1475, and possibly including the one or more network interfaces 1440) that are connected using the I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1400 can act as a host electronic device (e.g., operating as part of a hardware virtualization service) that hosts compute resources such as compute instances, and the one or more offload cards 1470A or 1470B execute a virtualization manager that can manage compute instances that execute on the host electronic device. As an example, in some examples the offload card(s) 1470A or 1470B can perform compute instance management operations, such as pausing and/or un-pausing compute instances, launching and/or terminating compute instances, performing memory transfer/copying operations, etc. These management operations can, in some examples, be performed by the offload card(s) 1470A or 1470B in coordination with a hypervisor (e.g., upon a request from a hypervisor) that is executed by the other processors 1410A-1410N of the computer system 1400. However, in some examples the virtualization manager implemented by the offload card(s) 1470A or 1470B can accommodate requests from other entities (e.g., from compute instances themselves), and cannot coordinate with (or service) any separate hypervisor.

In some examples, the system memory 1420 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1400 via the I/O interface 1430. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1400 as the system memory 1420 or another type of memory. Further, a computer-accessible medium can include transmission media or signals such as electrical, electromagnetic, or digital signals, conveyed via a communication medium such as a network and/or a wireless link, such as can be implemented via the network interface 1440.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method for machine learning (ML)-powered code generation, the method comprising:
receiving a request to generate code using a trained Transformer-based language model, the request including input text and one or more of natural language text, one or more types of quantization to apply, or an indication to apply quantization;
applying the trained Transformer-based language model to the input text to generate the code, the application of the trained Transformer-based language model including fusing one or more general matrix multiplications (GEMMs) with element-wise operations and using quantization in at least one linear layer of the trained Transformer-based language model; and
outputting the code from the trained Transformer-based language model.

2. The computer-implemented method of claim 1, wherein the quantization is to quantize data into an 8-bit integer format.

3. The computer-implemented method of claim 1, wherein the request includes one or more of natural language text, one or more types of quantization to apply, or an indication to apply quantization.

4. A computer-implemented method for machine learning (ML)-powered code generation, the method comprising:
receiving a request to generate code based on a natural language statement using a trained Transformer-based language model;
applying the trained Transformer-based language model to the natural language statement, the application of the trained Transformer-based language model including fusing one or more general matrix multiplications (GEMMs) with element-wise operations; and
outputting a result from the trained Transformer-based language model.

5. The computer-implemented method of claim 4, wherein the application of the trained model further comprises using quantization in at least one layer of the trained model.

6. The computer-implemented method of claim 5, wherein the quantization is to quantize data into an 8-bit integer format, a 4-bit integer format, or an 8-bit floating point format.

7. The computer-implemented method of claim 4, wherein the trained model is Transformer-based.

8. The computer-implemented method of claim 7, wherein the Transformer-based model is a bidirectional encoder representations Transformer.

9. The computer-implemented method of claim 7, wherein the Transformer-based model is a generative pre-trained Transformer.

10. The computer-implemented method of claim 7, wherein attention heads of the Transformer-based model utilize quantization.

11. The computer-implemented method of claim 7, wherein the fusing one or more GEMMs with element-wise operations is applied during bias addition.

12. The computer-implemented method of claim 7, wherein the fusing one or more GEMMs with element-wise operations is applied during residual addition.

13. The computer-implemented method of claim 7, further comprising using per-tensor quantization in at least one linear layer of the trained model.

14. The computer-implemented method of claim 7, further comprising using per-column quantization in at least one linear layer of the trained model.

15. The computer-implemented method of claim 4, wherein the request is a prompt to generate code based on a natural language statement.

16. The computer-implemented method of claim 4, further comprising quantizing the trained model in response to a request to perform model quantization.

17. The computer-implemented method of claim 4, further wherein the input data is one of text, image, or audio data.

18. A system for use in machine learning (ML)-powered code generation, the system comprising:
one or more electronic devices to implement a ML-powered code generation service in a multi-tenant provider network, the ML-powered code generation service including instructions that upon execution by one or more processors cause the ML-powered code generation service to:
receive a request to generate code based on a natural language statement using a trained Transformer-based language model;
apply the trained Transformer-based language model to the natural language statement, the application of the trained Transformer-based language model including fusing one or more general matrix multiplications (GEMMs) with element-wise operations; and
output a result from the trained Transformer-based language model.

19. The system of claim 18, wherein the request is a natural language input.

20. The system of claim 18, wherein the result is a code snippet.

* * * * *